3,312,353
FLUID DEVICE WITH CARRYOVER MEANS
Nils O. Rosaen, Bloomfield Hills, Mich., assignor to The Rosaen Filter Company, Hazel Park, Mich., a corporation of Michigan
Filed Oct. 22, 1963, Ser. No. 317,937
13 Claims. (Cl. 210—453)

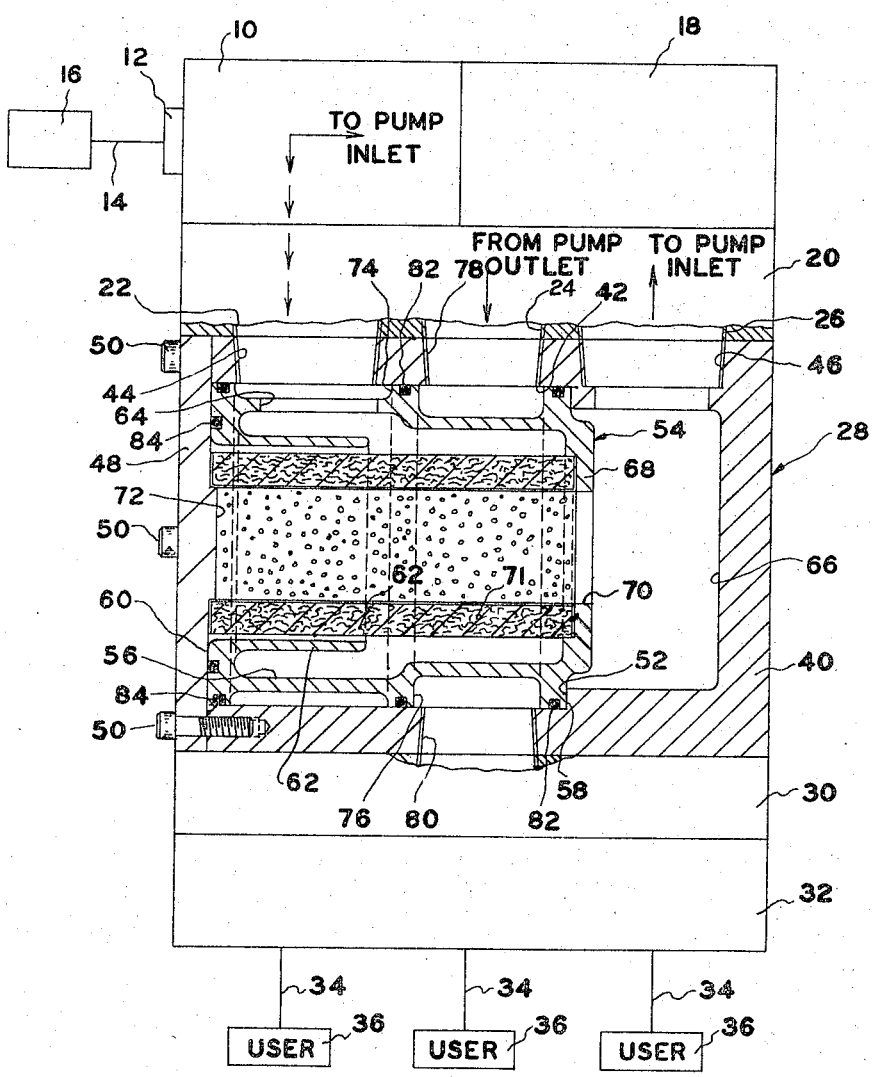

The present invention relates to fluid systems and more particularly to a new fluid device for use in systems for installation on mobile units, vehicles and the like.

In fluid systems for use on mobile units, vehicles or the like, it is customary because of the space limitations to arrange the various components of the system in a stacked compact relationship and to use as little conduit as possible. In such an arrangement it is often necessary to provide means for conducting fluid from one side of a component such as a filter device or valve or the like to the other side of the component without interfering with other fluid passages provided in the component. Heretofore a common method of achieving this result has been to provide a passage straight through the housing of the component.

Such a method, especially in high pressure systems in which the walls surrounding the passage must be relatively thick, either produces a component which requires a disproportionate amount of space or for instance when the component is a filtering device or the like, reduces the portion of the housing which is available for the filter element.

The present invention provides a fluid device for such systems in which a fluid treating member such as a filter element is removably carried in a housing and occupies the greater portion of the inner cavity of the housing. An inlet and an outlet opening to the filter element are provided on the side of the housing. To provide a means of conducting fluid from one side of the housing to the opposite side without passing through the filter element a baffle member is positioned to encompass the filter element and is provided with an annular recess sealed from the rest of the device and providing communication between carryover ports provided on each side of the housing.

Such a construction provides a fluid device such as a filtering device or the like which can be positioned within a stack of other components which comprise a fluid system. A passage through the device is provided which does not interfere with the primary function of the device and in which a maximum amount of space within the device can be devoted to that function.

It is an object then of the present invention to reduce the space requirements of fluid devices provided with carryover passages by providing an insertable member for such devices having an annular recess communicating with a carryover port on each side of the device.

It is another object of the present invention to increase the space available to the filter element of filter devices having a carryover passage by providing means forming said carryover passage annularly and around said filter element.

Still further objects and advantages will readily occur to one skilled in the art to which the invention pertains upon reference to the drawing in which a preferred fluid device of the present invention is illustrated in longitudinal cross section and other suggested components of a fluid system incorporating the preferred fluid device are illustrated diagrammatically.

As illustrated in the drawing, a suggested filter system for use in mobile units, vehicles or other installations in which space is limited comprises a plurality of stacked compact components. By way of illustration only, these components may comprise a two-way valve 10 having an inlet 12 connected by a suitable conduit 14 to a fluid reservoir 16. A pump 18 is secured by any suitable means in a position adjacent the valve 10. A manifold member 20 is secured beneath the valve 10 and is provided on its lower side with a pair of spaced outlets 22 and 24 and an inlet 26. A fluid device 28 which will be described in greater detail below is positioned between the manifold member 20 and a valve 30. A manifold member 32 is secured beneath the valve 30. The manifold member 32 may be connected by suitable conduit 34 to several fluid users 36 as shown.

It is to be understood that the fluid system described is intended as a suggestion only and has been described solely for the purpose of illustrating one of the many uses of the fluid device 28 and the problem which the device 28 is intended to solve.

The fluid device 28 which forms the subject matter of the present invention preferably comprises a housing 40 closed at one end as shown and defining a substantially cylindrical chamber 42. An inlet 44 and an outlet 46 are provided in the housing 40 and communicate with the chamber 42. The open end of the housing 40 is closed by an end cap 48 removably secured to the housing 40 as by a plurality of bolts 50.

The chamber 42 is reduced in lateral section as shown to form a radially extending annular shoulder 52. A baffle member 54 preferably comprises a cylindrical wall portion 56 spaced radially inwardly from the inner surface of the housing 40. A radially outwardly extending annular flange 58 is provided adjacent one end of the wall portion 56 and engages the shoulder 52. The baffle member 54 is further provided with a radially extending end surface 60 at the opposite end of the wall portion 56 and engaging the end cap 48 so that the baffle member 54 is securely positioned in the chamber 42 intermediate the end cap 48 and the shoulder 52. An annular baffle portion 62 is formed in the baffle member 54 in a position radially inwardly spaced from the wall portion 56 and of an axial length somewhat less than the axial length of the wall portion 56 as shown.

The wall portion 56 is provided with a port 64 which registers with the inlet 44 and the baffle portion 62 is positioned in the path of fluid entering the inlet 44 and the port 64. The baffle member 54 is preferably somewhat less in axial length than the chamber 42 as shown to provide a sub-chamber 66 in registry with the outlet 46. The end of the baffle member 54 adjacent the sub-chamber 66 is provided with a radially inwardly extending flange portion 68 which defines a port 70 communicating with the sub-chamber 66.

A substantially cylindrical filter element 71 is carried within the baffle member 54 and is sandwiched between an annular boss portion 72 provided on the end cap 48 and the flange portion 68.

The wall portion 56 is provided with a radially outwardly extending flange portion 74 axially inwardly spaced from the flange 58 as shown and an annular recess 76 is provided intermediate the flange portion 74 and the flange 58. The recess 76 is positioned to register with carryover ports 78 and 80 provided in opposite sides of the housing 40. O-ring seals 82 are preferably carried by the flange 58 and flange portion 74 to prevent fluid leakage from the recess 76. Seals 84 are carried by the baffle member 54 to prevent fluid leakage between the end cap 48 and the housing 40. In this way the components of the fluid device 28 are effectively sealed so that separate fluid paths are maintained.

The fluid device 28 of the present invention provides a means of conducting fluid from one side of the device to the other side of the device without requiring conduits and without interferring with the operation of the filter element 71 carried in the device. By providing the annular recess 76 in the baffle member 52 a minimum of space within the housing 40 is required for the carryover passage and thus the amount of space remaining for the filter element 71 or other fluid treating means is substantially increased. Further, the particular construction utilized substantially reduces manufacturing costs since it is relatively simple and economical to form the recess 76 in the baffle member 54.

A suggested use of the device 28 is illustrated diagrammatically in the drawings. The suggested fluid system comprises a plurality of stacked and compact components as described above and would operate as follows: Fluid would be pumped by the pump 18 and would enter inlet 12 of the two way valve 10 from the reservoir 16 and would be directed either to the pump 18 or the manifold member 20 as indicated by the arrows included in the drawing. The manifold member 20 would conduct the fluid through the outlet 22 which is in registry with the inlet 44 provided in the device 28. Fluid would then be pumped by the pump 18 through the inlet 44 radially inwardly through the filter element 71 through the port 70 and out the outlet 46. The baffle portion 62 protects the filter element 71 from the direct force of the incoming fluid. The filtered fluid would then be conducted through the outlet 46 to the inlet 26 of the manifold member 20 and to the inlet of the pump 18.

Fluid conducted to the pump 18 from either the valve 10 or the manifold member 20 would be conducted through the outlet 24 provided in the manifold member 20 to the carryover port 78 provided in the housing 40 of the device 28. The fluid would then pass through the filter device 28 by way of the recess 76 and the carryover port 80. The fluid would then pass through the valve 30 and mainfold member 32 to the desired users 36.

It is clear that since the fluid device 28 is provided with several inlets 44 and 78 and several outlets 46 and 80 and directs fluid through two or more separate paths through the device it can be considered to be a manifold member. It is also clear that any number of carryover ports like the ports 78 and 80 could be provided in the device to register with separated annular recesses like the recess 76 in the baffle member 52.

It is apparent that although I have illustrated a suggested use of the fluid device of my invention that the device can be used in any system where it is necessary to conduct fluid from one side of the device to the other and where space limitations prohibit separate conduit for this purpose. It is also apparent that although it has been preferred to describe the device as comprising a filtering means that other fluid means could be carried in the housing 40 as well.

It is further apparent that although I have described but one preferred construction of the device of the present invention, other changes and modifications can be made without departing from the spirit of the invention as expressed by the appended claims.

I claim:
1. A fluid device comprising
   (a) a housing having a wall defining a chamber and an inlet and an outlet communicating with said chamber,
   (b) fluid treating means carried in said chamber intermediate said inlet and said outlet,
   (c) a second inlet and a second outlet being provided in said housing on opposite sides thereof and means conducting fluid from said second inlet to said second outlet,
   (d) said conducting means comprising a substantially cylindrical member provided in said chamber, said fluid treating means being carried within said member, and an annular recess provided in said member between said member and said wall and registering with said second inlet and said second outlet, said annular recess having an axial length substantially less than the axial length of said fluid treating means, said second inlet and said second outlet each having an opening extending radially outwardly from said annular recess.

2. The device as defined in claim 1 and including sealing means carried by said member to prevent fluid leakage from said recess.

3. The device as defined in claim 2 and including an end cap removably secured to one end of said housing and said housing being provided with a radially inwardly extending shoulder portion provided in said chamber, said member being removably positioned intermedate said end cap and said shoulder portion.

4. The device as defined in claim 2 and in which said fluid treating means comprises a substantilly cylindrical filter element carried in a position radially inwardly spaced from said member, and said member is provided with a baffle portion positioned in the path of fluid entering said first mentioned inlet.

5. The fluid device as defined in claim 1 and in which said second inlet and said second outlet each have an opening extending radially outwardly from said annular recess with said second inlet and said second outlet openings extending on axes in substantially a common plane.

6. A fluid device comprising
   (a) a housing having a wall defining a substantially cylindrical chamber and an inlet and an outlet opening to said chamber,
   (b) a substantially cylindrical member carried in said chamber in a position spaced from said housing,
   (c) a substantially cylindrical filter element carried within said member,
   (d) said cylindrical member having a first port providing communication between said inlet and the exterior of said filter element and a second port providing communication between the interior of said filter element and said outlet,
   (e) a second inlet and a second outlet being provided in said housing, said second inlet and said second outlet each having an opening extending radially outwardly from said annular recess with the axes of said openings extending in substantially a common plane, and
   (f) an annular recess being provided in said cylindrical member between said member and said wall and in registry with said second inlet and said second outlet.

7. The device as defined in claim 6 and in which
   (a) said cylindrical member is provided with a pair of axially spaced radially outwardly extending flange portions engaging said housing,
   (b) said recess being provided intermediate said flange portions, and
   (c) sealing means being carried by said flange portions.

8. The device as defined in claim 7 and in which said cylindrical member is provided with baffle means adjacent said first port whereby said filter element is protected from the direct force of the fluid entering said first mentioned inlet.

9. A manifold device comprising
   (a) an axially elongated housing having a wall defining a chamber and an inlet and an outlet communicating with said chamber,
   (b) a second inlet and a second outlet being provided in said housing and means conducting fluid from said second inlet to said second outlet,
   (c) said conducting means comprising a substantially cylindrical member carried in said chamber and an annnular recess provided in said member between said member and said wall and registering with said second inlet and said second outlet, said second inlet and said second outlet each having an opening extending radially outwardly from said annular recess on substantially coplanar axes, and a fluid treating means being carried within said member.

10. A manifold device comprising
(a) a housing having a wall defining a plurality of inlets and a plurality of outlets,
(b) means conducting fluid from each of said inlets respectively to one of said outlets,
(c) one of said conducting means comprising a cylindrical member, a fluid treating means carried within said member, said member being disposed intermediate one of said inlets and one of said outlets and providing a fluid path from said last mentioned inlet axially through said cylindrical member to said last mentioned outlet, and
(d) another of said conducting means comprising an annular recess provided in said cylindrical member between said member and said wall and registering with another of said inlets and said outlets with said annular recess being substantially less in axial length than said cylindrical member, said another of said inlets and said outlets each having an opening extending radially outwardly from said annular recess.

11. A fluid device comprising
(a) a housing having a wall defining a substantially cylindrical chamber and an inlet and an outlet opening to said chamber,
(b) a substantially cylindrical member carried in said chamber and including a pair of axially spaced radially outwardly extending flange portions engaging said housing to mount said cylindrical member in a position spaced from said housing,
(c) a sealing means carried by said flange portions,
(d) a substantially cylindrical filter element carried within said member,
(e) said cylindrical member having a first port providing communication between said inlet and the exterior of said filter element and a second port providing communication between the interior of said filter element and said outlet,
(f) a second inlet and a second outlet being provided in said housing,
(g) an annular recess being provided in said cylindrical member intermediate said flange portions between said member and said wall and in registry with said second inlet and said second outlet, said second inlet and said second outlet each having an opening extending radially outwardly from said annular recess,
(h) said cylindrical member being provided with baffle means adjacent said first port whereby said filter element is protected from the direct force of the fluid entering said first mentioned inlet,
(i) a cap member removably secured to one end of said housing and said cap member and said cylindrical member being provided with means positioning said filter element.

12. A fluid device comprising
(a) a housing having a wall defining a substantially cylindrical chamber and an inlet and an outlet opening to said chamber,
(b) a substantially cylindrical member carried in said chamber in a position spaced from said housing,
(c) a substantially cylindrical filter element carried within said member,
(d) said cylindrical member having a first port providing communication between said inlet and the exterior of said filter element and a second port providing communication between the interior of said filter element and said outlet,
(e) a second inlet and a second outlet being provided in said housing,
(f) an annular recess being provided in said cylindrical member between said member and said wall and in registry with said second inlet and said second outlet, said second inlet and said second outlet each having an opening extending radially outwardly from said annular recess,
(g) a cap member removably secured to one end of said housing, and
(h) said cap member and said cylindrical member being provided with means positioning said filter element.

13. A fluid device comprising
(a) a housing having a wall defining a chamber and an inlet and an outlet communicating with said chamber,
(b) fluid treating means carried in said chamber intermediate said inlet and said outlet,
(c) a second inlet and a second outlet being provided in said housing and means conducting fluid from said second inlet to said second outlet,
(d) said conducting means comprising a substantially cylindrical member provided in said chamber and an annular recess provided in said member between said member and said wall and registering with said second inlet and said second outlet, said second inlet and said second outlet each having an opening extending radially outwardly from said annular recess,
(e) a cap member removably secured to one end of said housing, and
(f) said cap member and said cylindrical member being provided with means positioning said fluid treating means.

References Cited by the Examiner

UNITED STATES PATENTS

| | | | |
|---|---|---|---|
| 316,925 | 4/1885 | Vogel | 210—435 |
| 582,399 | 5/1897 | Stifel | 210—108 |
| 582,405 | 5/1897 | Stifel | 210—108 |
| 1,115,784 | 11/1914 | Cranwell et al. | 210—453 |
| 1,866,970 | 7/1932 | Garland et al. | 210—186 |
| 2,064,511 | 12/1936 | Wells | 210—186 |
| 2,169,620 | 8/1939 | Spayd | 137—625.43 X |
| 2,226,045 | 12/1940 | Baldwin | 210—456 X |
| 2,360,020 | 10/1944 | Skinner et al. | 210—456 X |
| 2,867,237 | 1/1959 | Allingham | 137—625.43 X |
| 3,026,892 | 3/1962 | Tsien | 137—625.62 X |

FOREIGN PATENTS 1,152,267  9/1957  France.

REUBEN FRIEDMAN, *Primary Examiner.*

D. M. RIESS, *Assistant Examiner.*